Oct. 11, 1960  H. SCHIEBER ET AL  2,955,634
TIRE TRACTION CHAIN
Filed May 25, 1959  2 Sheets-Sheet 1
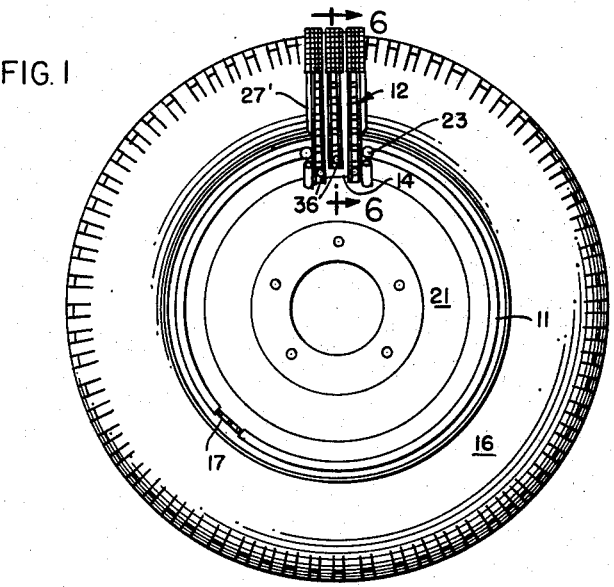
FIG. 1
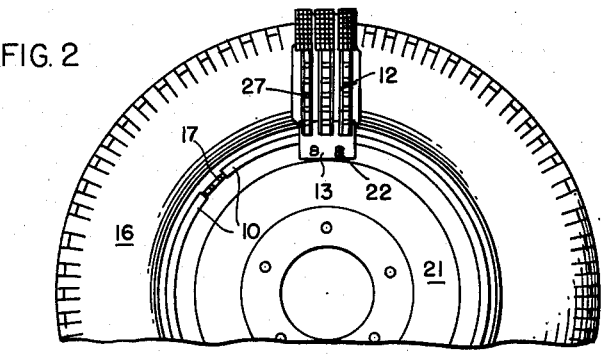
FIG. 2
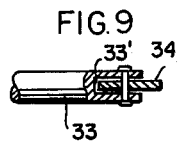
FIG. 9
FIG. 3
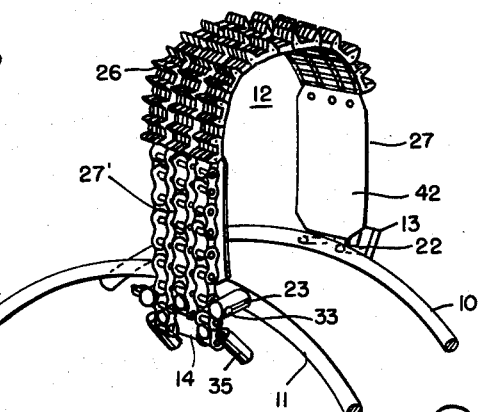
FIG. 8
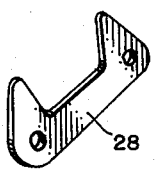
INVENTORS:
HANS SCHIEBER
PAUL BINDEL
BY
ATT'YS Oct. 11, 1960 H. SCHIEBER ET AL 2,955,634
TIRE TRACTION CHAIN
Filed May 25, 1959 2 Sheets-Sheet 2
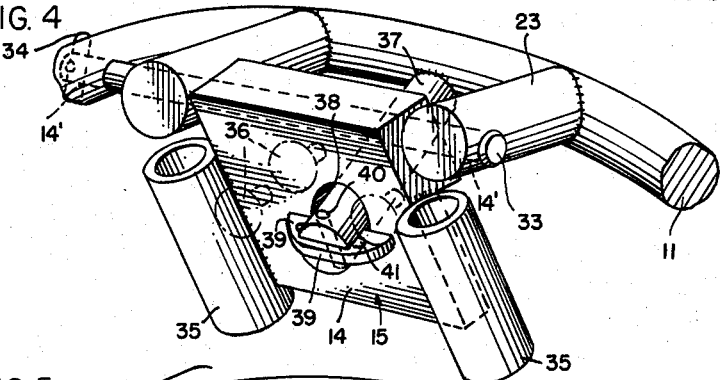
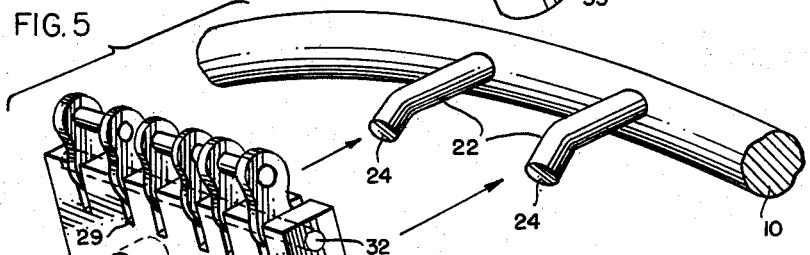
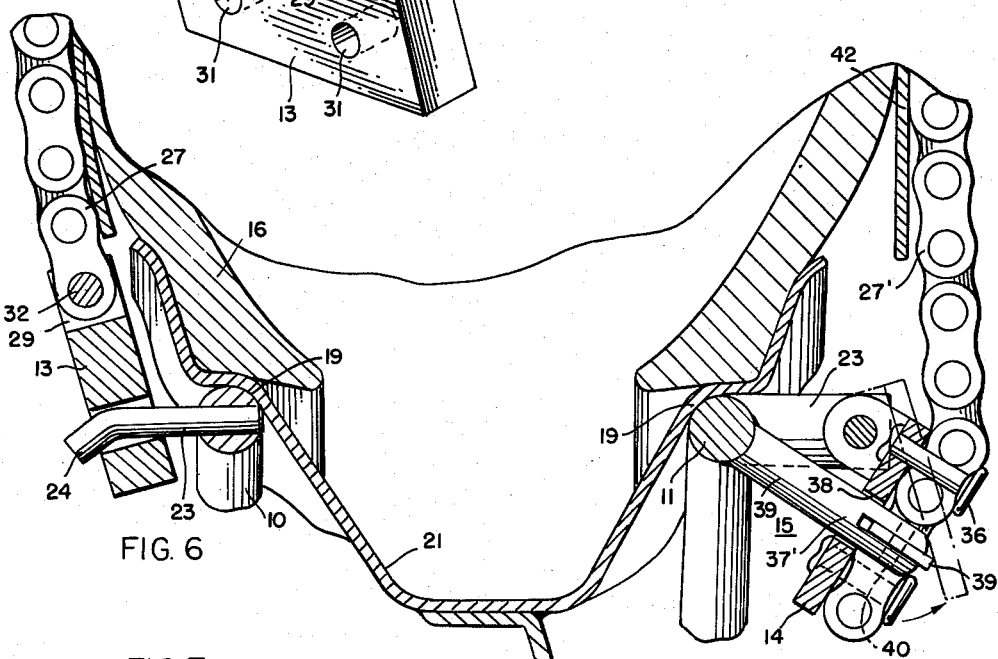
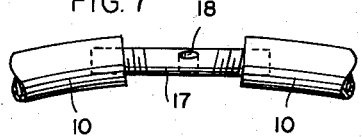
INVENTORS:
HANS SCHIEBER
PAUL BINDEL
BY
ATT'YS

United States Patent Office 2,955,634
Patented Oct. 11, 1960

2,955,634

TIRE TRACTION CHAIN

Hans Schieber, 2270 W. Logan Blvd., and Paul Bindel, 3946 W. North Ave., both of Chicago, Ill.

Filed May 25, 1959, Ser. No. 815,389

7 Claims. (Cl. 152—233)

This invention relates to improvements in motor-vehicle-tire traction-chains.

The main objects of this invention are to provide an improved form of motor-vehicle-tire chains to insure traction for the drive wheels on roads presenting slippery conditions; to provide an improved form of traction chains of this kind whereby one or more may be independently placed over a tire tread; to provide an improved means for anchoring the opposite ends of predetermined lengths of chains to the tire supporting rims of a wheel; to provide improved traction chains of this kind wherein the chains and the rim anchoring-means are separately formed for compact storage and/or shipment and easily assembled for positioning on the tire and disassembled for placing in storage; and to provide an improved means for protecting a tire against unnecessary abrasion.

In the adaptation shown in the accompanying drawings;

Figure 1 is a side view of a conventional motor-vehicle tire mounting a traction chain constructed in accordance with this invention;

Fig. 2 is a reverse view of the same;

Fig. 3 is a perspective view of this improved form of traction chain;

Fig. 4 is an enlarged, perspective, view of the latch clamp whereby one end of a chain is anchored to the tire-supporting rim;

Fig. 5 is an exploded view of the block whereby the other end of the chain is anchored to the supporting rim;

Fig. 6 is an enlarged, fragmentary, cross-sectional view of the traction chain in place on a tire rim as viewed from the plane of the line 6—6 of Fig. 1;

Fig. 7 is an enlarged, fragmentary view of the ring expanding-bolt;

Fig. 8 is an enlarged, perspective view of one of the links which make up the road-contacting part of the chain; and Fig. 9 is a fragmentary side view of a pin and locking device.

The essential concept of this invention involves a pair of rings, each mounting radial prongs, the rings expansible into concave grooves in a tire-supporting rim and one or more parallel lengths of chains attached at one end to the prongs on one of the rings and at the other end a member hinged on the other ring prongs for swinging into and out of position for latching the chains in embracively taut position over a tire tread.

A motor-vehicle-tire traction-chain embodying the foregoing concept comprises a pair of expansible and contractible rings 10 and 11, and at least one set of parallel lengths of chains 12 attached at one end to a block 13, for connection to the rings 10, and at the other end to a member 14, for hinging to the ring 11 so as to swing into and out of position to be secured by a latch means 15 to embracively tauten and retain the chains 12 over the tread of a tire 16.

The rings 10 and 11, here shown, are round rods of reasonably resilient metal bent into circular form. The abutting ends have nearly-axially opposed threaded recesses to receive the opposite ends of a bolt 17 formed with left-right threads so that the turning of the bolt 17 expands or contracts the rings 10 and 11 in a conventional manner. An aperture 18 through the middle of the bolt 17 permits the insertion of a pin (not shown) for turning the bolt 17.

These rings 10 and 11 are of a diameter such that, when contracted to the full limit of the bolt 17, they will be of a diameter less than that of the annular grooves 19 of a tire-supporting rim 21 into which the rings are to be anchored when they are properly expanded by an opposite turning of the respective bolts 17.

The rings 10 and 11 each mounts one or more pairs of prongs 22 and 23 respectively, extending radially outward therefrom substantially parallel with their axes. The prongs 22 are slightly smaller than the prongs 23 and are bent adjacent their extremities to form shoulders, whereas the pair of larger prongs 23 have cooperating apertures through their respective extremities, for reasons which presently will appear.

A set of traction chains 12 may be almost any type of linkage of irregularly-shaped parts that will form a tread capable of biting into a road surface over which a vehicle has to travel but which, for the moment, is such that the conventional rubber tire treads cannot secure traction. Almost any kind of linkage could be used to form these chain sets. However, as herein shown, the chains 12 are formed of three lengths of linkage each made up of a middle section 26 and two end sections 27 and 27'.

The middle section 26 of each length of chain is formed of two-pronged links 28 (see Fig. 8) pivoted together in multiple groups, the section 26 being of a length to extend beyond the opposite circumferential edges of the tread section of the tire 16. The end sections 27 and 27' are here shown as lengths of conventional link sprocket chains which at their respective free ends are secured to the block 13 and the member 14.

The block 13 (Fig. 5) is formed with a series of transverse slots 29 along one edge, a longitudinal bore through the slots, and a pair of transverse prong apertures 31. The slots 29 are adapted to receive the terminal links on the end section 27 of the chain set 12, and are secured therein by a pin 32. Thus secured to the block 13, the chain set 12 is attached to the ring 10 by seating the block 31 over the prongs 22 inwardly of the shoulders 24.

The member 14 is hinged to the prongs 23, on the ring 11, by a headed pin 33 extending through the cooperating apertures adjacent the free ends of the prongs 23 and an alined bore 14' adjacent one edge of the member 14. The opposite end of the pin 33 mounts a conventional toggle 34 (Figs. 4 and 9) for securing the pin 33 against unintentional displacement. The toggle is mounted in the cleft 33' of pin 33.

Short lengths of tubes 35 are bonded to the opposite lateral edges of the member 14. These are adapted to seat the end of a suitable tool, such as a length of rod, for applying power necessary to swing the member 14 to properly tauten the chains 12 over the tire 16 and shift the free end of member 14 over the center of the pivot 33.

A set of rivets 36, inserted through certain of the links in the end section 27' of the chain set 12, secures the several lengths of the chain to the member 14.

The latch means 15 comprises a post 37, on the ring 11, extending through aperture 38 in the member 14 and mounting a toggle 39.

The post 37 extends radially outward from the ring 11, intermediate the prongs 23 and inwardly downward from the common plane of the prongs 23. The hole 38, for the reception of this post 37, is near the center of the member 14. The toggle 39 is of a width less than the diameter of the hole 38 and of a length greater than such diameter and is held in a cleft 37' in end of the post 37 by a pin 40 extending through a toggle slot 41 (Fig. 4).

In order to insure against abrasion of the tire 16, pads 42 (Fig. 3) are secured on the inside of each of the end sections 27 and 27' of the chain set 12.

This improved form of traction chains is used in the following manner:

The bolts 17, on the respective rings 10 and 11, are turned to contract the rings sufficiently to permit their seating in the rim grooves 19. The opposite turning of the bolts 17 will so tighten the rings 10 and 11 into these grooves as to secure them against any accidental dislodgment from the tire rim 17.

The block 13 is then seated over the prongs 22 beyond the shoulders 24 and the chain set 12 is placed over the tire tread and the pin 33 inserted through the alined apertures in the ends of the prongs 11 and bore in the member 14. Turning of the toggle 34 will secure this connection against dislodgment.

By inserting a tool, i.e. rod, into one of the tubes 35 the member 14 is swung downwardly toward the base of the tire rim 17 to permit the end of the toggle 39 and the post 37 to enter the hole 38. This movement of the member 14 will embracively tauten the chain set 12 over the tire tread. Turning the toggle 39, transverse to the post 37, will lock the member 14 against dislodgment from the ring 11.

When there is no longer need for this emergency traction chain, the member 14 is released from the post 37 and the chains removed from around the tire 16 and the block 13 slipped off from the prongs 22. Thereupon, the rings 10 and 11 may be removed from the tire rim 19. However, during the winter months the rings 10 and 11 are kept on the rims for immediate availability when the chains are needed. These disassembled parts may then be stored away in the vehicle or otherwise until needed again.

Obviously, where desired, two or more sets of the prongs could be arranged on each of the rings 10 and 11 to make possible the simultaneous use of two or more chain sets 12 on one tire to better insure traction for especially slippery road conditions.

On some trucks the tire rim may be flat in cross section instead of grooved as shown in the drawing at 19. In this case the ring 10 will be flat in cross section instead of round in cross section as would be obvious to those skilled in the art.

Although but one specific embodiment of this invention is herein shown and described it will be understood that details of the construction shown may be altered or omitted without departing from the spirit of the invention as defined by the following claims.

We claim:

1. A motor-vehicle-tire traction-chain comprising, a pair of rings, means for expanding the rings into annular grooves on opposite sides of the tire-supporting rim, a member other than the hereinafter-mentioned length of chain hinged to one of the rings on an axis parallel to the axis of the ring for swinging in a plane transversely of the ring, a length of chain attachable at one end to the member and at the other end to the other ring for positioning the chain across the tire tread whereby the swinging of the free end of the member from a position outwardly away from the rim to a position inwardly toward the rim will tauten the length of chain across the tire tread, and latch means for securing the member in the latter position to retain the chain embracively taut over the tire tread.

2. A motor-vehicle-tire traction-chain comprising, a pair of rings, means for expanding the rings into annular grooves on opposite sides of the tire-supporting rim, a member other than the hereinafter-mentioned lengths of chain hinged to one of the rings on an axis parallel to the axis of the ring for swinging in a plane transversely of the ring, a series of parallel lengths of chain, means removably attaching the chains at one end to the member, other means for removably attaching the lengths of chain to the other ring for positioning the chains across the tire tread whereby the swinging of the free end of the member from a position outwardly away from the rim to a position inwardly toward the rim will tauten the chains across the tire tread, and latch means for securing the member in shifted position to retain the chains embracively taut over the tire tread.

3. A motor-vehicle-tire traction-chain comprising, a pair of rings, means for expanding the rings about annular grooves on opposite sides of the tire-supporting rim, a member other than the hereinafter-mentioned length of chain hinged to one of the rings on an axis parallel to the axis of the ring for swinging in a plane transversely of the ring, a length of chain attachable at one end to the member and at the other end to the other ring for positioning the length of chain across the tire tread whereby the swinging of the free end of the member from a position outwardly away from the rim to a position inwardly toward the rim will tauten the length of chain across the tire tread, a socket on the member other than the chain connection thereto for seating a tool for swinging the member to tauten the chains embracively over the tire tread, and latch means for securing the member in its chain-tautening position.

4. A motor-vehicle-tire traction-chain comprising, a pair of rings, means for expanding the rings into annular grooves on opposite sides of a tire-supporting rim, a member other than the hereinafter-mentioned lengths of chain hinged to one of the rings on an axis parallel to the axis of the ring for swinging in a plane transversely of the ring, a series of parallel lengths of chain, means removably attaching the chains at one end to the member, other means for removably attaching the chains at the other end to the other ring for positioning the lengths of chain across the tire tread whereby the swinging of the free end of member from a position outwardly away from the rim to a position inwardly toward the rim will tauten the lengths of chain across the tire tread, a socket other than the chain connection to the ring on the member for seating a tool for swinging the member to embracively tauten the chains over the tire tread, and latch means on the one ring for securing the member in its chain-tautening position.

5. A motor-vehicle-tire traction-chain comprising, a pair of expansible-contractible rings, pairs of axially-disposed prongs on each of the rings, means for expanding the rings into annular grooves on opposite sides of the tire-supporting rim, a member hinged to the pair of prongs on one of the rings for swinging in a plane transversely of the ring, a block apertured to seat over the prongs on the other ring, a plurality of parallel lengths of chains hinged at one end to the block, fasteners securing the chains at their other end to the member whereby the swinging of the member will tauten the chains embracively over the tire tread, and latch means on the other ring for securing the member in its chain-tautening position.

6. A motor-vehicle-tire traction chain comprising, a pair of expansible-contractible rings, pairs of axially-disposed prongs on each of the rings, means for expanding the rings into annular grooves on opposite sides of the tire-supporting rim, a member hinged to the pair of prongs on one of the rings for swinging in a plane transversely of the ring, a block apertured to seat over the prongs on the other ring, a plurality of parallel lengths of chains hinged at one end to the block, fasteners securing the chains at their other end to the member whereby the swinging of the member will tauten the chains embracively over the tire tread, a post on the one ring extending radially outward intermediate the pair of prongs at an angle to the common plane of the prongs, the member having a hole for receiving the free end of the post when the member is swung into its chain-tautening position, and a toggle on the post shiftable into position for latching the member against dislodgment from the post.

7. A motor-vehicle-tire traction chain comprising, a pair of expansible-contractible rings, pairs of axially-disposed prongs on each of the rings, means for expanding the rings on opposite sides of the tire-supporting rim, a member hinged to the pair of prongs on one of the rings for swinging in a plane transversely of the ring, a block apertured to seat over the prongs on the other ring, a plurality of parallel lengths of chains hinged at one end to the block, fasteners securing the chains at their other end to the member whereby the swinging of the member will tauten the chains embracively over the tire tread, a post on the one ring extending radially outward intermediate the pair of prongs at an angle to the common plane of the prongs, the member having an aperture for receiving the free end of the post when the member is swung into its chain-tautening position, and a toggle on the post shiftable into position for latching the member against dislodgement from the post.

References Cited in the file of this patent

UNITED STATES PATENTS

| 1,426,208 | Mulcahey | Aug. 15, 1922 |
| 1,478,059 | Pye | Dec. 18, 1923 |
| 2,457,208 | Carpenter | Dec. 28, 1948 |